(12) United States Patent
Woodward

(10) Patent No.: US 6,865,651 B2
(45) Date of Patent: *Mar. 8, 2005

(54) METHOD AND SYSTEM FOR OPTIMIZING TRANSLATION BUFFER RECOVERY AFTER A MISS OPERATION WITHIN A MULTI-PROCESSOR ENVIRONMENT

(75) Inventor: James Alan Woodward, Merrimack, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/689,883

(22) Filed: Oct. 21, 2003

(65) Prior Publication Data

US 2004/0088499 A1 May 6, 2004

Related U.S. Application Data

(63) Continuation of application No. 09/258,477, filed on Feb. 26, 1999, now Pat. No. 6,647,468.

(51) Int. Cl.[7] .............................................. G06F 12/00
(52) U.S. Cl. ...................... 711/147; 711/150; 711/151; 711/153; 711/158; 711/163
(58) Field of Search ................................. 711/147, 150, 711/151, 153, 156, 158, 163

(56) References Cited

U.S. PATENT DOCUMENTS

| | | |
|---|---|---|
| 5,055,999 A | 10/1991 | Frank et al. |
| 5,056,000 A | 10/1991 | Chang |
| 5,553,267 A | 9/1996 | Herlihy |
| 5,579,504 A | 11/1996 | Callander et al. |
| 5,640,528 A | 6/1997 | Harney et al. |
| 5,669,002 A | 9/1997 | Buch |
| 5,761,729 A | 6/1998 | Scales |
| 5,761,731 A | 6/1998 | Van Doren et al. |
| 5,802,604 A | 9/1998 | Stewart et al. |
| 5,907,862 A | 5/1999 | Smalley |
| 5,960,458 A | 9/1999 | Kametani |
| 6,081,279 A | 6/2000 | Reddy |
| 6,233,668 B1 | 5/2001 | Harvey et al. |
| RE37,305 E | 7/2001 | Chang et al. |

OTHER PUBLICATIONS

Sites et al., "Aspha AXP Architecture Reference Manual," 1995, pp. 5–9 to 5–21, Second Edition, Digital Press.
Adve et al., "Shared Memory Consistency Models: A Tutorial," WRL Research Report 95/7, Sep., 1995, Western Union Library, Palo Alto, California.
Andrew S. Tanenbaum, "Distributed Operating Sytem," Prentic–hall, inc., pp. 325–327.

*Primary Examiner*—Mano Padmanabhan
*Assistant Examiner*—Mehdi Namazi

(57) ABSTRACT

A distributed computer system is disclosed that allows shared memory resources to be synchronized so that accurate and uncorrupted memory contents are shared by the computer systems within the distribute computer system. The distributed computer system includes a plurality of devices, at least one memory resource shared by the plurality of devices, and a memory controller, coupled to the plurality of devices and to the shared memory resources. The memory controller synchronizes the access of shared data stored within the memory resources by the plurality devices and overrides synchronization among the plurality of devices upon notice that a prior synchronization event has occurred or the memory resource is not to be shared by other devices.

10 Claims, 3 Drawing Sheets

| CPU1 | CPU2 | CPU3 | CPU4 |
|---|---|---|---|
| INITIALIZE PAGE FRAME FOR ADDRESS VIRTUAL "FOO" | | | INITIALIZE PAGE FRAME FOR ADDRESS VIRTUAL "FOO" |
| MB | TBL MISS ON ADDRESS "FOO" | | WRITE PTE FOR "FOO" WITH V-BIT SET AND MO BIT CLEAR |
| WRITE PTE FOR "FOO" WITH V-BIT SET AND MO BIT SET | . . . | | TBL MISS ON ADDRESS "FOO" |
| . . . | FETCH PTE | | FETCH PTE |
| | TEST MO AND ISSUE MB IF NEEDED | | TEST MO AND BYPASS MB |
| . . . | . . . | . . . | . . . |

*FIG. 4*

METHOD AND SYSTEM FOR OPTIMIZING TRANSLATION BUFFER RECOVERY AFTER A MISS OPERATION WITHIN A MULTI-PROCESSOR ENVIRONMENT

This is a continuation of application Ser. No. 09/258,477 filed on Feb. 26, 1999, now U.S. Pat. No. 6,647,468.

FIELD OF THE INVENTION

The present invention relates generally to a multi-processor computer system and, more particularly, to a distributed computer system comprising multiple processors and shared memory resources.

BACKGROUND OF THE INVENTION

Distributed computer systems typically comprise multiple computers connected to each other by a communications network. In some distributed computer systems, the networked computers can concurrently access shared data. Such systems are sometimes known as parallel computers. If a large number of computers are networked, the distributed system is considered to be "massively" parallel. As an advantage, parallel computers can solve complex computational problems in a reasonable amount of time.

In such systems, the memories of the computers are collectively known as a distributed shared memory. It is a problem to ensure that the data stored in the distributed shared memory are accessed in a coherent manner. Coherency, in part, means that only one computer can modify any part of the data at any one time; otherwise, the state of the data would be nondeterministic.

Some distributed computer systems maintain data coherency using specialized control hardware. The control hardware may require modifications to the components of the system such as the processors, their caches, memories, buses, and the network. In many cases, the individual computes may need to be identical or similar in design, which means they are homogeneous.

Consequently, hardware controlled shared memories are generally costly to implement. In addition, such systems may be difficult to scale. Scaling means that the same design can be used to conveniently build smaller or larger systems.

More recently, shared memory distributed systems have been configured using conventional workstations or PCs connected by a conventional network as a heterogeneous distributed system. In such systems, data access and coherency control are typically provided by software-implemented message passing protocols. The protocols define how fixed size data blocks and coherency control information is communicated over the network. Procedures that activate the protocols can be called by "miss check code." The miss check code is added to the programs by an automated process.

States of the shared data can be maintained in state tables stored in memories of each processor or workstation. Prior to executing an access instruction, e.g., a load or a store instruction, the state table is examined by the miss check code to determine if the access is valid. If the access is valid, then the access instruction can execute, otherwise the protocols define the actions to be taken before the access instruction is executed. The actions can be performed by protocol functions called by the miss handling code.

The calls to the miss handling code can be inserted into the programs before every access instruction by an automated process known as instrumentation. Instrumentation can be performed on executable images of the programs.

U.S. Pat. No. 5,761,729, entitled Validation Checking of Shared Memory Accesses, issued Jun. 2, 1998. discloses a method for providing valid memory between processors or input/output interfaces connected to processors, all of which access the shared memory within the distributed computer environment. The method provides instrumentation to initialize the bytes allocated for the shared data structure to a predetermined flag value. The flag value indicates that the data are in an invalid state.

Unfortunately, the prior art system is directed towards a generic solution for covering shared memory accesses with a distributed computer environment. It is not able to correct or provide management for specific processors that follow specific read/write ordering functions such as the Alpha AXP microprocessor, manufactured by Digital Equipment Corporation, Maynard, Mass.

The Alpha AXP processor can be used in a single processor environment or in multiple processor environments such as a distributed computer environment. Additionally, the Alpha AXP processor is considered to be in a multi-processor environment when it includes a single processor with a direct memory access (DMA) input/output (I/O). In a multi-processor data stream, the Alpha AXP communicates shared data by writing the shared data on one processor or DMA I/O device, executes a memory barrier (MB) or a write MB (WMB), then writes a flag signaling the other processor that the shared data is ready. Each receiving processor must read the new flag, execute an MB, then read or update the shared data. In the special case in which data is communicated through just one location in memory, memory barriers are not necessary.

In a significant special case occurrence, when a write is done to some physical page frame, an MB is executed and a previously invalid page table entry (PTE) is changed to be a valid mapping of the physical page frame that was just written. In this case, all processors that access virtual memory by using the newly valid PTE must guarantee to deliver the newly written data after the translation buffer (TB) miss, for both I-stream and D-stream accesses, where I represents instructions and D represents data.

The overall operation of the Alpha AXP processor is described in ALPHA AXP ARCHITECTURE REFERENCE MANUAL, Second Edition, Sites and Witek, Published by Digital Press, 1995, incorporated by reference for all purposes.

Unfortunately, this multi-processor synchronization is very expensive in terms of performance. Without the synchronization, data may be corrupted when a page fault occurs on one CPU and the recently faulted data is immediately referenced from another CPU. The execution of the MB instruction in the TB-Miss flow after fetching the PTE forces a memory coherency point. Any outstanding cache coherency operations are completed prior to using the PTE to fetch data. Unfortunately, there is a performance penalty that results in up to 20% degradation in performance on the Alpha AXP processor. Unfortunately, not in all cases is the memory ordering necessary. Accordingly, what is needed is a way of limiting ordering to only those threads or processes that are actually sharing the PTE effected by the initial MB.

SUMMARY OF THE INVENTION

According to the present intention, a distributed computer system is disclosed that allows shared memory resources to be synchronized so that accurate and uncorrupted memory contents are shared by the computer systems within the distribute computer system. The distributed computer system includes a plurality of devices, at least one memory resource shared by the plurality of devices, and a memory controller, coupled to the plurality of devices and to the shared memory resources. The memory controller synchronizes the access of shared data stored within the memory resources by the plurality devices and overrides synchronization among the plurality of devices upon notice that a prior synchronization event has occurred or the memory resource is not to be shared by other devices.

A method for managing memory synchronization is also presented that determines whether a memory element within the memory resource has changed, determines whether a memory synchronization event has occurred among the multiple devices, and synchronizes the multiple devices if no synchronization event has occurred. The method may also determine whether the memory resource is to be shared with more than one of the multiple devices and prevents the synchronization of the memory resource if the memory resource is not to be shared. The memory resource can comprise page frame memory. The method may further generate an issue slot for each device to manage instructions given each of the devices and to observe the change of a memory element and the need for a memory synchronization determination.

BRIEF DESCRIPTION OF THE DRAWINGS

The above and further advantages of the invention may be better understood by referring to the following description in conjunction with the accompanying drawings and which:

FIG. 4 depicts a queue table of multiprocessor and their instructions to be executed according to the present invention.

DETAILED DESCRIPTION OF THE PREFERRED EMBODIMENT

Figure 1:
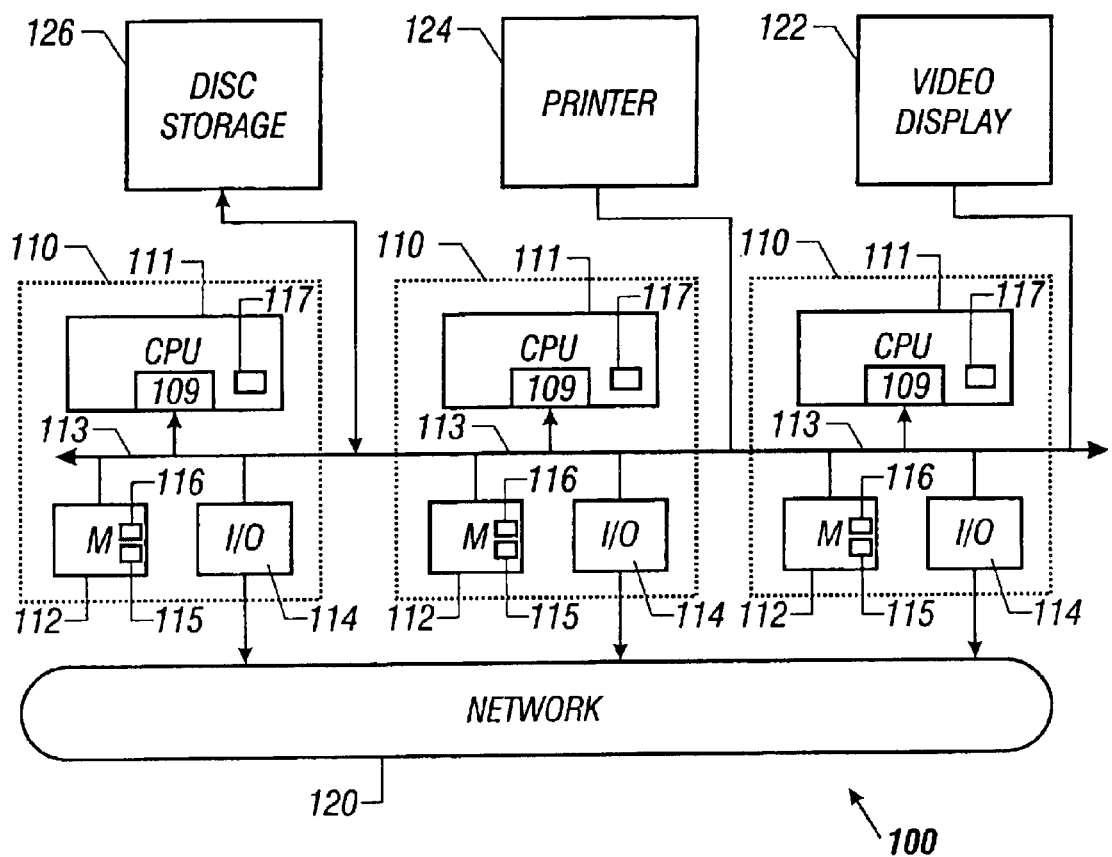
FIG. 1 is a block diagram illustrating a distributed computer system according to the present invention.

FIG. 1 shows a multi-processor computer system 100 that accesses a shared memory resource and is enhanced by the principles of the present invention. The system 100 includes a plurality of co-processor units 110 connected to each other by a common system bus 113. Each unit 110 includes a processor (CPU) 111. At least one shared memory (M) store 112 is provided and each CPU 111 may have its own memory store 112 as shown in FIG. 1. Further at least one input/output interface (I/O) 114 may be connected to at least one of the CPUs 111 and each CPU 111 may have its own interface 114 as shown in FIG. 1.

The multi-processor computer system 100 can include a homogeneous (symmetric) or heterogeneous set of processors such as, for example, Alpha microprocessors, provided by Compaq, Inc., of Houston, Tex. Further processors 111 can be CISC or RISC. The processors 111 can include hardware caches 109 to stored frequently accessed data and instructions. Further, the computer system 100 includes a video system 122, for displaying information to the user, as well as other data output means such as a printer 124 and disc drive 126. Drive 126 can include, but is not limited to, a floppy disc, a CD-ROM drive, a hard disc, and other fixed or non-fixed storage media.

The memories 112 can be dynamic random access memories (DRAM). The memories 112 store program 115 and data structures 116. Some of the addresses of the memories 112 can be designated as a single set of shared virtual addresses. Some of the data structures can include shared data. Shared data can be accessed by programs executing on any of the processors 111 using the virtual addresses. Each processor 111 further comprises a register 117, which holds the program queue of steps to be implemented by the processor. The register 117 holds the current program state. The program states include a program counter (PC), a stack pointer (SP), and additional general purpose registers (GPRs). The GPRs can be used as source/destinations for arithmetic operations, memory reads/writes and for program branches. The buses 113 connect the components of the computer unit using data, address, and control lines. The computer system 110 can be connected to other systems via a network connection 120 that uses network protocols for communicating messages among the workstations 110, for example, asynchronous transfer mode (ATM), or FDDI protocols.

General System Operation

During operation of the system 100, instructions of the program 115 are executed by the processors 111. The instructions can access the data structure 116 using load and store instructions. Typically, the accessed data are first stored in the caches 109 and then in processor registers 117 while manipulated by the processors. It is desired that any of program 115 executing on any of the processors 111 can access any of shared data structures 116 stored in any of the memories 112.

Instrumentation

Therefore, as is described herein, program 115 avoids instrumentation prior to execution. Instrumentation is a process that locates access instructions (loads and stores) in the program 115. Once the access instructions have been located, additional instructions, such as, for example, a miss check code, can be inserted into the programs before the access instructions to ensure that the access is performed correctly. The miss check code is optimized to reduce the amount of overhead required to execute the additional instructions.

Program 115 actually does not utilize instrumentation, but rather, when a virtual access is done by program 115, a translation lookaside buffer (TLB) is checked for a mapping. If no mapping is found, then program execution is sent to the TLB miss flows. These miss flows load the proper page table entry (PTE) into the TLB and, if needed, perform memory synchronization. The present invention is directed toward a method and system of performing memory synchronization with the PTE.

As stated above, the program 115 can view some of the addresses of the distributed memories 112 as a shared memory. For a particular target address of the shared memory, an instruction may access a local copy of the data or a message must be sent to another processor requesting a copy of the data.

Access States

With respect to any processor, the data stored in the shared memory can have any one of three possible states: invalid, shared, or exclusive. In addition, as described below, data states can be in transition, or "pending." If the state is invalid, the processor is not allowed to access the data. If the state is shared, the processor has a copy, and other processors may have a copy as well. If the state is exclusive, the processor has the only valid copy of the data, and no other processor can have valid copies of the data.

The states of the data are maintained by coherency control messages communicated by the bus 113 which maintains coherency among the symmetric processors.

Data can be loaded from the shared memory into a local processor only if the data have a state of shared or exclusive. Data can be stored only if the state is exclusive. Communication is required if a processor attempts to load data that are in an invalid state, or if a processor attempts to store data that are in an invalid or shared stated. These illegal accesses are called misses.

The addresses of the memories 112 can be allocated dynamically to store shared data. Some of the addresses can be statically allocated to store private data only operated on by a local processor. Overhead can be reduced by reserving some of the addresses for private data, since accesses to the private data by the local processor do not need to be checked for misses.

As in a hardware-controlled shared memory system, addresses of the memories 112 are partitioned into allocable blocks. All data within a block are accessed as a coherent unit. As a feature of the system 100, blocks can have variable sizes for different ranges of addresses. To simplify the optimized miss check code described below, the variable sized blocks are further partitioned into fixed-size ranges of addresses called "lines."

State information is maintained in a state table on a per line basis. The size of the line is predetermined at the time that a particular program 115 is instrumented, typically 32, 64 or 128 bytes. A block can include an integer number of lines.

During the operation of the system 100, prior to executing a memory access instruction, the miss check code determines which line of a particular block includes the target address (operand) of the instruction. In addition, the miss check code determines if the target address is in shared memory. If the target address is not in shared memory, the miss check code can immediately complete, since private data can always be accesses by a local processor.

The system constitutes the collection of processors 111, I/O devices 114, with an optional bridge to connect remote I/O devices, and shared memory resources 112 that are accessible by all processors 111. Direct memory access (DMA) I/O devices or other components can read or write shared memory locations in the shared memory resources 112. A shared memory resource is the primary storage place for one or more locations. A location is an unlined quad word, specified by its physical address. Multiple virtual addresses can map to the same physical address. Ordering considerations are based only on the physical address. A definition of location specifically includes locations and registers in memory map I/O devices, and bridges to remote I/O devices.

Each processor 111, which also includes the I/O devices, can generate accesses to the shared memory resource locations. There are six types of accesses:

1. Instruction fed by processor i to location x, returning value a;
2. Data read by processor i to location x, returning value a;
3. Data write by processor i to location x, storing value a;
4. Memory barrier (MB) instruction issued by processor i;
5. Write memory barrier (WMB) instruction issued by processor i;
6. I-stream memory barrier instruction issued by processor i.

The first access type is also called an I-stream access or I-fetch. The next two are also called D-stream accesses. The first three types collectively are called read/write accesses. The last three types collectively are called barriers or memory barriers.

Instruction fetches are long word reads. Data reads and data writes are either aligned long word or aligned quad word accesses. Unless otherwise specified, each access to a given location of the same access size During execution within the system, each processor has a time order issue sequence of all the memory access presented by that processor (to all memory locations), and each location has a time ordered access sequence of all the accesses is presented to that location (from all processors).

Memory barriers (MB) are calls made to order memory access on a particular CPU. There are no implied memory barriers within this system. If an implied barrier is needed for functionally correct access to shared data, it must be written as an explicit instruction. In other words, an explicit instruction for an MB, WMB or call—PAL IMB instructions are to be provided within the software implemented within this hardware system.

Within system 100, one way to reliably communicate shared data is to write the shared data on one processor or DMA I/O device, execute an MB, or the logical equivalent if it is a DMA I/O device, then write a flag, or the equivalent of sending an interrupt, signaling the other processor that the shared data is ready. Each receiving processor must read the new flag, which is equivalent to receiving the interrupt, execute an MB, then read or update the shared data. In the special case in which data is communicated through just one location in memory, memory barriers are not necessary.

The first MB assures that the shared data is written before the flag is written. The second MB assures that the shared data is read or updated only after the flag is seen to change. In this case, an early read may see an old memory value, and an early update could have been reoverwritten.

This implies that after a DMA I/O device has written some data to memory, such as paging in a page from disc, the DMA device must logically execute an MB before posting a completion interrupt, and the interrupt handler software must execute an MB before the data is guaranteed to be visible to the interrupted processor. Other processors must also execute MBs before they are guaranteed to see the new data. In one special case, a write is done to a given physical page frame, then an MB is executed, next a previously-invalid page table entry (PTE) is changed to be a valid mapping of the physical page frame that was just written. In this case, all processors that access virtual memory by using the newly valid PTE must guarantee to deliver the newly-written data after the translation buffer (TB) miss, for both the I-stream and the D-stream accesses.

In the above scenario, the translation buffer miss after page fault must be performed for each processor or I/O device within the system. In order to streamline the synchronization step required to resynchronize all the processors to the memory resources, a page table entry (PTE) bit is used to indicate whether or not a TB-miss must incur the synchronization penalty. Since synchronization really is only required when a page is being actively shared among two or more CPUs in the multiprocessor system, and only the first TB-miss after a page fault needs to take the synchronization penalty, a bit to signify that synchronization must occur for that processor or to indicate that no synchronization is necessary for that process as the resynchronization had been preformed at a prior step, enables the present invention to eliminate unnecessary synchronization that have otherwise been required. Further, the PTE bit is set to indicate that when no synchronization for any page is required when that page is not being shared. The PTE bit also is set on shared pages when it is known that all CPUs already synchronized in a subsequent TB-misses deem not performed further synchronization.

Figure 2:
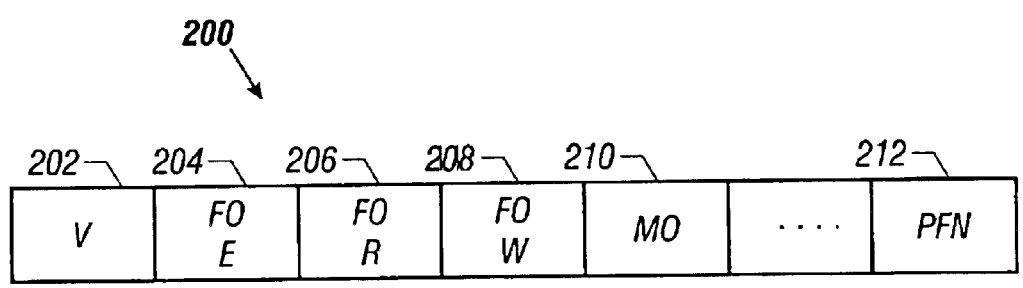
FIG. 2 is a block diagram illustrating a bit stream for performing memory synchronization according to the present invention.

A data block illustrating the implementation of the PTE bit is shown in FIG. 2. Data block 200 includes various bits that are used for various levels of information. First bit 202 is a valid bit (V) bit that indicates the validity of the PFN field. Bit 204 is a fault on execute (FO E) exception bit that, when set, provides a fault on execute exception on an attempt to execute any location in the page. Bit 206 is a fault on read (FO R) exception bit and, when set, provides a fault on read exception on an attempt to read any location in the page. Next, a fault on write (FO W) exception bit 208 provides that, when set, a fault on read exception occurs on an attempt to read any location in the page. Bit 210 is a Memory Ordering (MO) which when set, causes the TLB miss flows to issue an MB instruction after fetching PTE with the V bit set. Lastly, bit 212 provides for a physical page frame number (PFN) that identifies the memory resource being upgraded and synchronized within the system.

Figure 3:
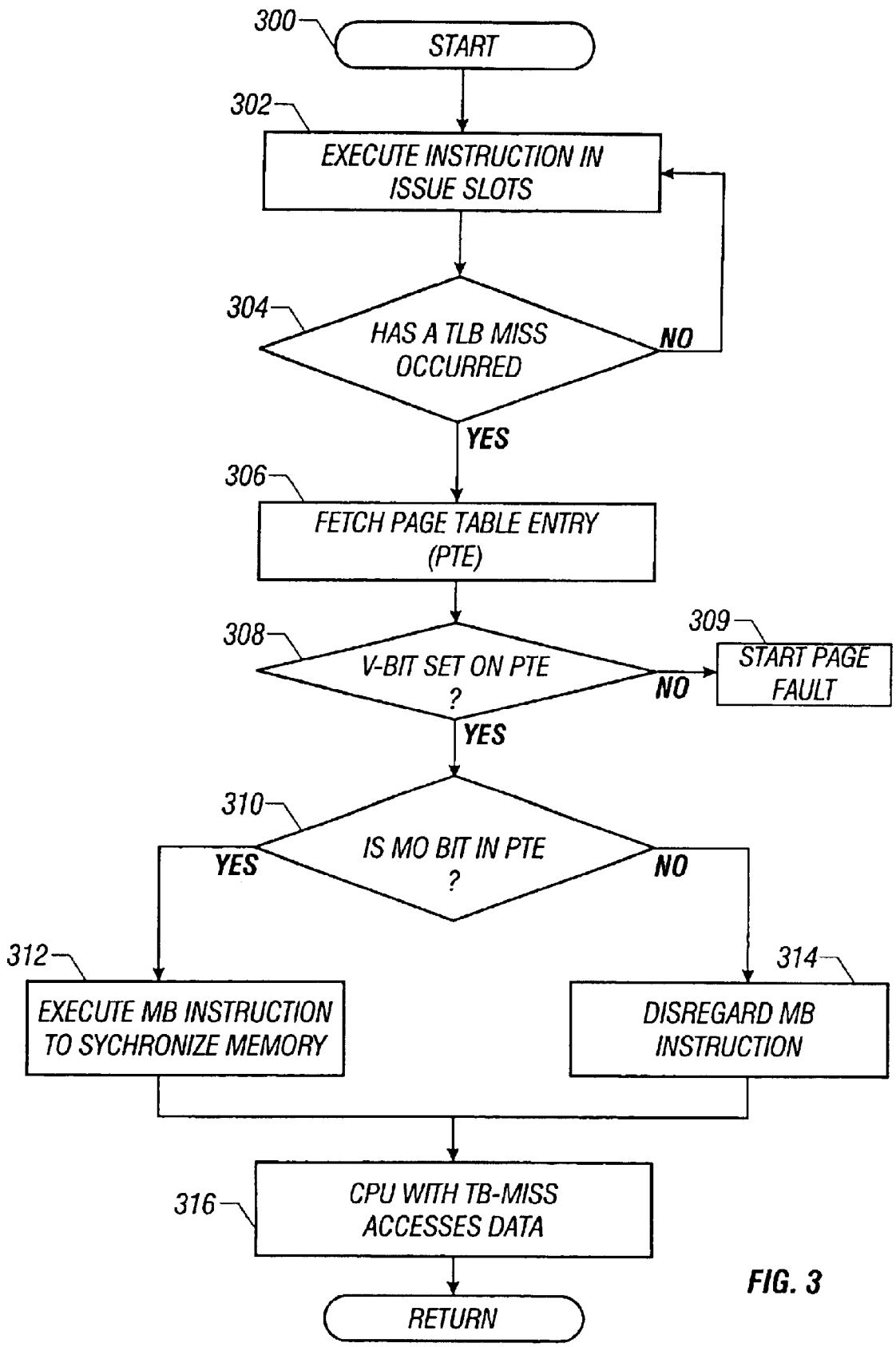
FIG. 3 is a flow chart depicting the process of synchronizing memory according to the present invention.

FIG. 3 illustrates a flow chart depicting the method steps in accordance with the present invention for synchronizing the memory resources within the system. In conjunction with FIG. 3, a processing queue table 400 is depicted in FIG. 4. Queue table 400 illustrates N issue slots, one issue slot 402 for each coprocessor or I/O device provided in the system. In this example, a system instruction is provided within adjoining rows for each issue slot 402 for the first two co-processors, labeled CPU1 and CPU2, respectively. In this particular system, CPU1 is the first processor in sequence within this system, which is a Symmetric multi-processor (SMP) system. The method starts in step 300 then proceeds to step 302. In step 302, the system begins executing each instruction located in the particular issue slots 402. For example, an initialize page frame for the address virtual "FOO" may be found in slot 402 for CPU1 that is then executed. After the instructions continue to be read and executed, the system, in step 304, may experience a translation look aside buffer (TLB) miss based on an MB by CPU1, in this case in issue slot 402 for CPU2. At this moment, in step 306, a page table entry (PTE) fetch occurs as the instruction in issue slot 402 for CPU1. This PTE instruction traverses all instructions within the queue table 400 for each processor. Next, in step 308, for the processor that had the TLB miss (CPU2), it is determined if the valid bit was set for the PTE in CPU1. If not, in step 309, the CPU starts a page fault. The instructions issued for CPU3 and CPU4 are unaffected by CPU2 resolving the reading of the desired information. If yes, the CPU proceeds to step 310.

Neither CPU3 nor CPU4 is affected by the TLB miss operation of CPU2. Also, CPU1 Is unaware that CPU2 is fetching a PTE validated by CPU1. Moreover, CPU4, in this example, is accessing a private page so that no MB is needed. The private page is not available or shared with any of the other CPUs. As such, the integrity of the private page is assured.

In step 310, the TB miss is identified to determine if the PTE bit has been activated. If the PTE bit has been activated, then, in step 312, the system executes the MB instruction to stall the execution of all instructions until memory synchronization is performed for that page frame. If the PTE bit is not present, then, in step 314, the system disregards the MB request and accesses the data. Once the memory resources have been synchronized across the system, the processor having the TB-miss instruction then accesses the data in step 316. After access is granted, the system resumes executing the instructions in the issue slots like in step 302.

Furthermore, once all CPUs have synchronized memory, the MO bit my be cleared or disabled, thus eliminating the need to do a subsequent MB on any future TLB misses. This would follow step 312 of FIG. 3. Otherwise, the prior solution has been to require an MB for each TLB misses even after a first MB has cleared the page fault in the first instance. This results in fewer cycles in the states of FIG. 4, thus increasing system performance over previous methods of handling page faults in a SMP system such as this one.

Thus, it has been shown to provide a memory ordering solution to prevent memory errors where data has been corrupted due to a read and then subsequent write. The use of the conditional memory ordering bit found in PTE bit 210 allows memory synchronization to occur only in those situations absolutely necessary while avoiding those situations where memory synchronization has already been done or is not necessary, such in the case where the processor is accessing a memory resource that is not being shared. The MO PTE bit acts as a flag to signal to the TB-miss flows that memory ordering is needed. The PTE_MB bit is set only on PTEs that are shared between threads or processes. The purpose of TB-miss MB is to synchronize with other processors, not with the current processor. The MB forces a coherency point between the fetching of the PTE and the fetching of the data with the PTE. Without an MB, the PTE can be read and used by the processor prior to any outstanding writes to the data pointed to by the PTE. Further, the PTE-MB bit can be cleared in the PTE whenever all processors can safely feed the data associated with the PTE, thus rendering synchronization unnecessary.

The usefulness of the PTE_MB bit increases system performance by avoiding those situations where synchronization is not necessary, but was otherwise performed in the prior art. Thus, unnecessary processing steps are eliminated, which leads to faster processing performance. The invention provides for communicating to the TLB miss flows whether memory ordering is needed. Just like a PTE valid bit is used to communicate to the TLB flows that a PTE is valid, or a FOE tells the code to fault if the instruction stream tries to execute code pointed to by a PTE.

A software implementation of the above described embodiment(s) may comprise a series of computer instructions either fixed on a tangible medium, such as a computer readable media, e.g. a diskette, CD-ROM, ROM, or fixed disk for use with any of the computer processors 110 of FIG. 1, or transmittable to a computer system, via a modem or other interface device, such as a communications adapter connected to the network 120 over a medium. The medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method for managing memory synchronization in a computer system having multiple devices sharing memory resources, comprising:

determining whether a memory element within the memory resource has changed;

determining whether a memory synchronization event has occurred among the multiple devices;

synchronizing the multiple devices if no synchronization event has occurred; and preventing synchronizing of the memory resource with the multiple devices if the memory resource is not to be shared.

2. The method of claim 1 wherein the memory resource comprises a page frame memory.

3. The method of claim 1 wherein determining whether a memory element within the memory resource has changed comprises:

determining an occurrence of a translation buffer error.

4. The method of claim 1 further comprising:

generating an issue slot for each device to manage instructions given each of the plurality devices and to observe the change of a memory element and the need for a memory synchronization determination.

5. A computer program product implemented on a computer system, the computer program product having computer useable code to manage memory synchronization in the computer system having multiple devices sharing memory resources, comprising:

computer program code to determine whether a memory element within the memory resource has changed;

computer program code to determine whether a memory synchronization event has occurred among the multiple devices;

computer program code to synchronize the multiple devices if no synchronization event has; and computer program code to prevent synchronizing of the memory resource with the multiple devices if the memory resource is not to be shared.

6. The computer program product of 5 wherein the memory resource comprises a page frame memory.

7. The computer program product of claim 5 further comprising computer program code to determine the occurrence of a translation buffer error.

8. The computer program product of claim 5 further comprising computer program code to generate an issue slot for each device to manage instructions given each of the plurality devices and to observe the change of a memory element and the need for a memory synchronization determination.

9. A system, comprising:

a plurality of processing devices;

a plurality of memory resources accessible to the processing devices;

means for synchronizing the memory resources to the processing device; and means for overriding synchronization of a memory resource when the memory resource is not shareable or has already been synchronized.

10. The system of claim 9 wherein the means for overriding synchronization of the memory resource comprises means for overriding synchronization upon an occurrence of a translation buffer error.

* * * * *

UNITED STATES PATENT AND TRADEMARK OFFICE
CERTIFICATE OF CORRECTION

PATENT NO. : 6,865,651 B2  
APPLICATION NO. : 10/689883  
DATED : March 8, 2005  
INVENTOR(S) : James Alan Woodward Page 1 of 1

It is certified that error appears in the above-identified patent and that said Letters Patent is hereby corrected as shown below:

Claim 5, Column 10, line 11, after "has" insert --occured--

Signed and Sealed this

Third Day of November, 2009

David J. Kappos  
*Director of the United States Patent and Trademark Office*